United States Patent
Fardig et al.

(10) Patent No.: US 9,785,429 B2
(45) Date of Patent: Oct. 10, 2017

(54) EFFICIENT DEPLOYMENT OF THIN CLIENT APPLICATIONS TO END USER

(71) Applicant: LENOVO (Singapore) PTE, LTD., New Tech Park (SG)

(72) Inventors: Matthew William Fardig, Boonville, IN (US); Riley G. Branch, Eagle Mountain, UT (US); Travis Lee Ennis, Jasper, IN (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 15 days.

(21) Appl. No.: 14/634,526

(22) Filed: Feb. 27, 2015

(65) Prior Publication Data

US 2016/0253170 A1 Sep. 1, 2016

(51) Int. Cl.
*G06F 9/44* (2006.01)

(52) U.S. Cl.
CPC . *G06F 8/68* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 6,381,742 B2* | 4/2002 | Forbes | | G06F 8/61 707/999.202 |
| 6,925,467 B2 | 8/2005 | Gu et al. | | |
| 6,938,096 B1* | 8/2005 | Greschler | | G06F 8/60 709/217 |
| 7,003,767 B2* | 2/2006 | Larkin | | G06F 8/65 717/169 |
| 7,478,142 B1* | 1/2009 | Veditz | | G06F 9/445 709/218 |
| 7,509,636 B2* | 3/2009 | McGuire | | G06F 8/68 709/217 |
| 7,590,981 B2* | 9/2009 | Gupta | | G06F 8/68 717/168 |
| 7,600,225 B2* | 10/2009 | Sliger | | G06F 8/68 707/999.202 |
| 8,296,756 B1* | 10/2012 | Feeser | | G06F 8/68 717/173 |

(Continued)

FOREIGN PATENT DOCUMENTS

MY  WO 2004023236 A2 *  3/2004  ....... G06F 17/30902

*Primary Examiner* — Tuan Q. Dam
*Assistant Examiner* — Zheng Wei
(74) *Attorney, Agent, or Firm* — Kunzler Law Group

(57) ABSTRACT

For efficient deployment of thin client applications to an end user, an apparatus for efficient deployment of thin client applications to an end user is disclosed. A method and computer program product also perform the functions of the apparatus. The apparatus, in one embodiment, includes a processor and a memory that stores code executable by the processor, wherein the code identifies, on a server, a first file package for a thin client application, the first file corresponding to a current version of the thin client application, receives identifying information for a second file package stored on a local device, compares the first file package to the second file package, and determines a minimum set of updates needed to transform the second file package into a copy of the first file package, in response to the first file package differing from the second file package.

18 Claims, 7 Drawing Sheets

(56) References Cited

U.S. PATENT DOCUMENTS

| | | | | |
|---|---|---|---|---|
| 8,312,447 B2* | 11/2012 | Callaghan | G06F 8/443 | 717/140 |
| 8,397,230 B2* | 3/2013 | Ewington | G06F 8/68 | 717/168 |
| 8,438,558 B1* | 5/2013 | Adams | G06F 8/68 | 717/168 |
| 8,473,938 B1* | 6/2013 | Feeser | G06F 8/68 | 717/168 |
| 8,713,555 B1* | 4/2014 | Feeser | G06F 8/68 | 717/168 |
| 8,959,504 B2* | 2/2015 | Stern | G06F 9/44 | 717/171 |
| 9,043,778 B2* | 5/2015 | Lin | G06F 8/68 | 717/170 |
| 9,122,558 B2* | 9/2015 | Ewington | G06F 8/68 | |
| 9,338,167 B2* | 5/2016 | Han | H04L 63/10 | |
| 2002/0026474 A1* | 2/2002 | Wang | G06F 9/445 | 709/203 |
| 2003/0066065 A1* | 4/2003 | Larkin | G06F 8/65 | 717/177 |
| 2003/0158919 A1* | 8/2003 | Fomenko | G06F 8/71 | 709/220 |
| 2003/0212712 A1* | 11/2003 | Gu | G06F 17/30067 | |
| 2005/0010670 A1* | 1/2005 | Greschler | G06F 8/60 | 709/227 |
| 2006/0080651 A1* | 4/2006 | Gupta | G06F 8/68 | 717/169 |
| 2008/0177638 A1* | 7/2008 | Butler | G06F 8/38 | 705/26.41 |
| 2009/0094596 A1* | 4/2009 | Kuiper | G06F 11/1433 | 717/174 |
| 2011/0113424 A1* | 5/2011 | Ewington | G06F 8/68 | 717/178 |
| 2012/0096451 A1* | 4/2012 | Tenbarge | G06F 11/1433 | 717/170 |
| 2012/0158819 A1* | 6/2012 | Anderson | G06F 9/5077 | 709/202 |
| 2012/0297181 A1* | 11/2012 | Lee | G06F 8/68 | 713/2 |
| 2013/0097595 A1* | 4/2013 | Stern | G06F 8/68 | 717/171 |
| 2014/0109076 A1* | 4/2014 | Boone | G06F 8/65 | 717/170 |
| 2014/0208306 A1* | 7/2014 | Halder | G06F 8/65 | 717/172 |
| 2014/0259005 A1* | 9/2014 | Jeffrey | G06F 8/65 | 717/173 |
| 2015/0249667 A1* | 9/2015 | Han | H04L 63/10 | 726/4 |

* cited by examiner

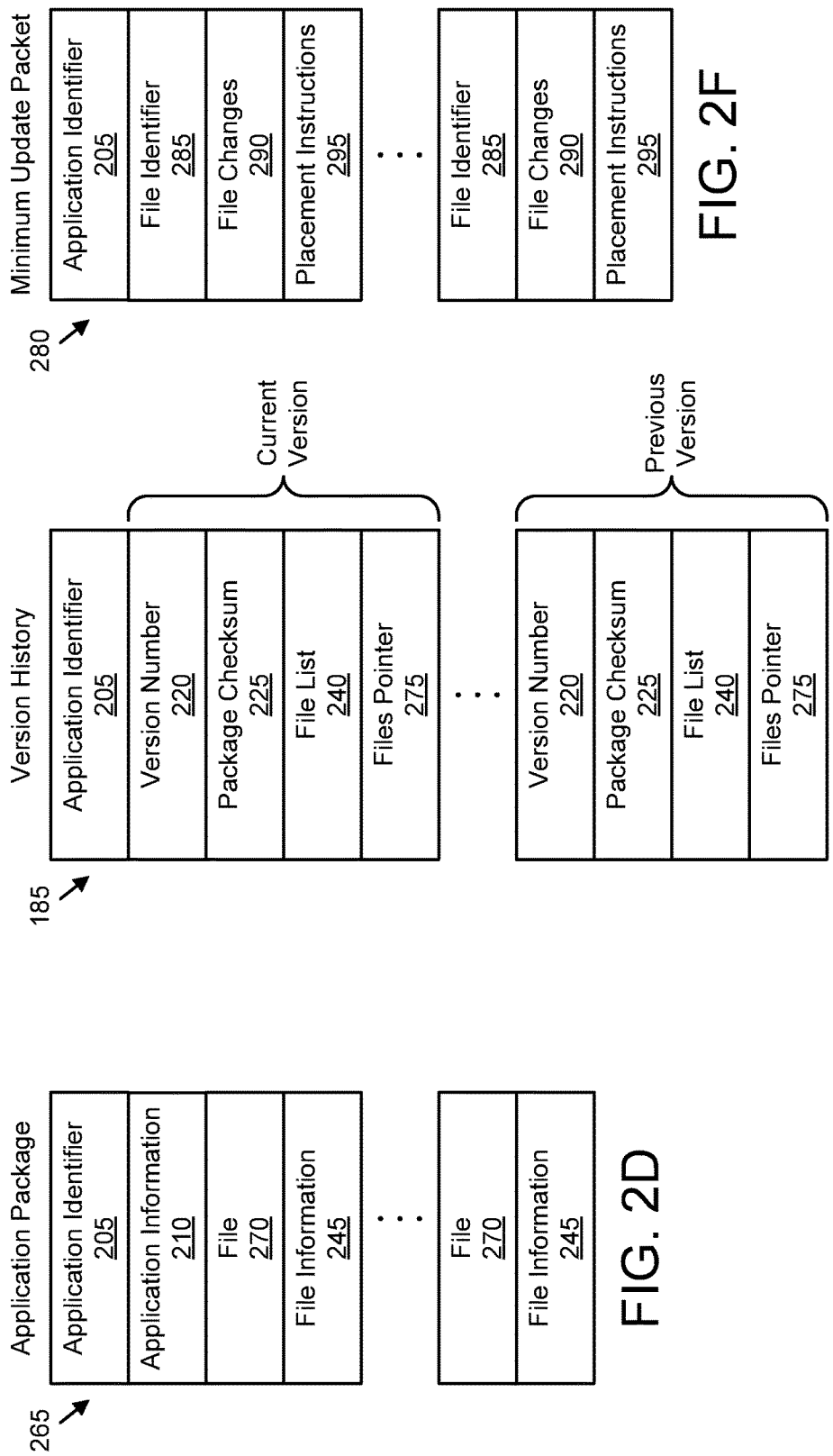

EFFICIENT DEPLOYMENT OF THIN CLIENT APPLICATIONS TO END USER

FIELD

The subject matter disclosed herein relates to thin client applications and more particularly relates to efficient deployment of thin client applications to an end user.

BACKGROUND

Description of the Related Art

Thin client applications (also, known as packaged applications) are designed to be executed without an installation. This allows a process, such as a web browser, to push the entire application to a local client, and then launch it, all without the need for the user to run an installation program, reboot the computer, and then launch the application.

BRIEF SUMMARY

An apparatus for efficient deployment of thin client applications to an end user is disclosed. A method and computer program product also perform the functions of the apparatus. The apparatus, in one embodiment, includes a processor and a memory that stores code executable by the processor, wherein the code identifies, on a server, a first file package for a thin client application, the first file corresponding to a current version of the thin client application, receives identifying information for a second file package stored on a local device, compares the first file package to the second file package, and determines a minimum set of updates needed to transform the second file package into a copy of the first file package, in response to the first file package differing from the second file package.

In certain embodiments, comparing the first file package to the second file package includes generating a first checksum from the first file package and comparing the first checksum to a local checksum generated from the second file package, wherein the identifying information comprises the local checksum. In certain embodiments, determining the minimum set of updates includes one or more of identifying a file in the first file package that is renamed in the second file package, identifying a file in the first file package that is not present in the second file package, and identifying a file within the second file package corresponding to an updated file within the first file package.

In some embodiments, the apparatus includes code that identifies a corrupted or missing file within the second file package, wherein the minimum set of updates includes a copy of the corrupted or missing file within the second file package. In some embodiments, the apparatus includes code that generates a binary differential from the first file package and the second file package, the binary differential indicating a location and value of a byte changed between the second file package and the first file package, wherein the minimum set of updates is based on the binary differential.

In some embodiments, the apparatus includes code that receives a user access request for the thin client application from the local device, wherein comparing the first file package to the second file package occurs in response to receiving the user access request and transfers the minimum set of updates to the local device.

The method, in one embodiment, includes receiving a launch request for a thin client application from a local device, wherein the launch request identifies a first file package stored on the local device, identifying a second file package for a thin client application, the second file package stored on a server and corresponding to a current version of the thin client application, comparing the first file package to the second file package, and compiling a minimum set of updates needed to transform the first file package into a copy of the second file package. In some embodiments, the method includes downloading the minimum set of updates to the local device in response to the launch request.

In certain embodiments, comparing the first file package to the second file package comprises comparing a first version number of the first file package to a second version number of the second file package. In certain embodiments, comparing the first file package to the second file package comprises comparing a first file list of the first file package to a second file list of the second file package, wherein compiling a minimum set of updates comprises including one or more files in the second file list that are not in the first file list.

In certain embodiments, comparing the first file package to the second file package further comprises comparing a first checksum for a first file in the first file list to a second checksum for a matching file in the second file list, wherein the minimum set of updates includes the matching file in response to the first checksum differing from the second checksum. In certain embodiments, comparing the first file package to the second file package further comprises comparing a first byte of a first file in the first file list to a second byte of a corresponding file in the second file list, wherein compiling a minimum set of updates comprises including the second byte and placement information for the second byte in response to the first byte differing from the second byte.

In some embodiments, the method includes storing a version history of the thin client application, the version history including changes to files associated with the thin client application from previous version to a newer version, wherein compiling a minimum set of updates is based on the version history.

In some embodiments, the method includes detecting an update to the second file package, identifying changes to the second file package due to the update, and storing the changes in a version history of the thin client application. In some embodiments, the method includes generating identifying information for the second file package, the identifying information for the second file package comprising one or more of a file list, a version number, a checksum, a file size, and a timestamp.

In certain embodiments, the launch request includes identifying information for the first file package, the identifying information for the first file package comprising one or more of a file list, a version number, a checksum, a file size, and a timestamp.

The computer program product, in one embodiment, includes a computer readable storage medium that stores code executable by a processor, the executable code including code to perform: receiving a launch request for a thin client application from a local device, wherein the launch request identifies a local file package stored on the local device, determining whether the local file package is out of date in response to the launch request, identifying a server file package for to the thin client application in response to the local file package being out of date, the server file package corresponding to a current version of the thin client application, and downloading, to the local device, a minimum set of updates needed to transform the local file package into a copy of the server file package.

In some embodiments, the computer program product includes code for identifying a file in the local file package that is renamed in the server file package, wherein the minimum set of updates comprises instructions to rename the file in the local file package. In some embodiments, the computer program product includes code for determining whether any file in the local file package is corrupted, wherein downloading the minimum set of updates includes downloading an uncorrupted version of the file. In certain embodiments, the launch request includes a checksum for each file of the local file package, and wherein determining whether any file in the local file package is corrupted comprises comparing a checksum for each file in the local file package to a corresponding file in the server file package.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2D is a schematic block diagram illustrating one embodiment of an application package used for efficient deployment of thin client applications to an end user;

FIG. 2E is a schematic block diagram illustrating one embodiment of a version history used for efficient deployment of thin client applications to an end user;

FIG. 2F is a schematic block diagram illustrating one embodiment of a minimum update packet used for efficient deployment of thin client applications to an end user;

DETAILED DESCRIPTION

Figure 1:
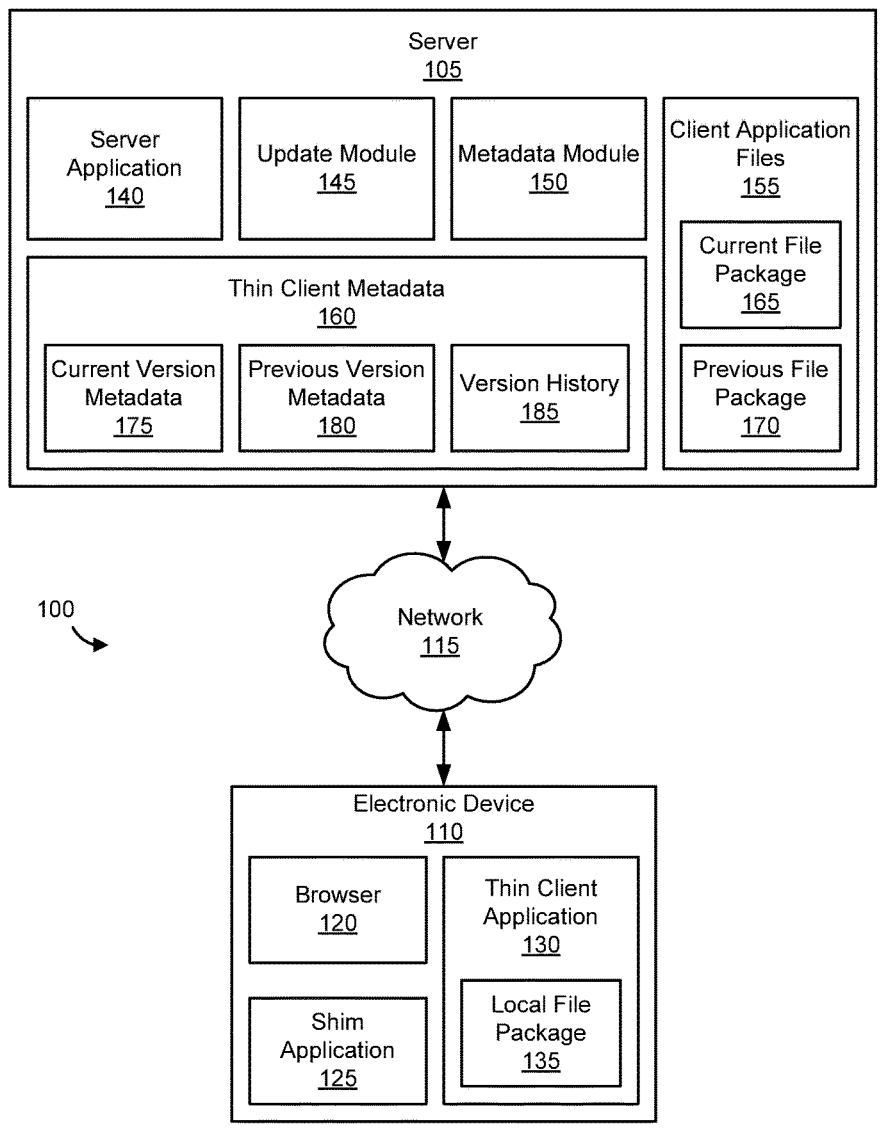
FIG. 1 is a schematic block diagram illustrating one embodiment of a data system for efficient deployment of thin client applications to an end user.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed embodiments provide for a more efficient means of delivering thin client applications to an end user. Initially, the entire thin client application is pushed down to the client device and run on the initial request. In some embodiments, a preinstalled shim application on the client device is used to download and execute the thin client application. The files used for the thin client application remain on the local machine so they can be run again at a future date without the need to re-download the same files. During a subsequent launch of the thin client application, a maintenance operation is performed on the files for the thin client application. If updates are available, only the changed portions of the already downloaded thin client application files are updated, and the now updated thin client application is launched/executed.

The disclosed embodiments are designed to push only the bare minimum number of bytes to the user prior to running a thin client application. The server maintains a copy of the thin client application. This may include, but is not limited to, an executable file, or a compressed file containing multiple files needed to run the thin client application. The initially deployed application is stamped with a version identifier. In one embodiment, the server calculates a checksum (e.g. an MD5 checksum, etc.) for each file that is part of the thin client application, and stores the checksum, file size, and last modified date/time for each file.

When an update is made to the thin client application on the server, the server goes through a process of identifying the changes. For any file, if the checksum, date/time, or size is different, file comparison table is created that stores the differences between the current file and the previous version of the file. The server stores a file comparison table for each file, for example as an update history or file history for each file. In one embodiment, the file comparison table indicates which bytes were changed and where the changed bytes are located in each file that is part of the thin client application. The version number is also incremented. The server maintains a history of these updates to the thin client application. Accordingly, the server stores an easily retrievable list of changes to each file that is part of the thin client application. Additionally, the server looks for new files, removed files, renamed files (files with same checksum as file that only existed in older version), updates to existing files, and the like.

When a user first requests the thin client application, the server delivers it to the client where it can be run. At this time, the entire package (compressed file or executable file) is pushed down to the client. That package may be modified by the server to contain information about the calculated checksum for each file in the package. The next time the user accesses the server to run the thin client application, rather than pushing the entire application, the client (through the use of a previously installed client shim application) sends an HTTP request to the server with information about the existing local installation of that thin client application. This existing installation information may include, but is not limited to, the version, the checksums, what files are currently on the client and dates/times/sizes.

The server receives the request and based on the information from the client, only streams back the updates need by that client. This includes possible changes in files between version of the application (update the user to the most recent version which might include new files), restoring files that may have been removed from the client, and updating the bytes at various locations in files that were updated. This ensures that the smallest possibly amount of data is streamed back to the preinstalled application shim running on the client. That shim receives the updates (the diffs between files, instructions to download or delete individual files, etc.), and applies the updates per the server's instructions (change these bytes in this file to this, delete this file, etc.). Once the updates are applied, the thin application is launched.

The disclosed embodiments ensure that only the bare minimum amount of data has to be passed from the server to the client to update or install the thin client application. Beneficially, this improves thin client application download times, improves thin client application launch times, helps protect limited data plans, and gives the appearance of faster thin application delivery on low bandwidth systems.

FIG. 1 is a schematic block diagram illustrating one embodiment of a data system 100. The system 100 includes a server 105, an electronic device 110, and a networks 115 through which the server 105 and the electronic device 115 may communicate. The network 115 may be the Internet, a local area network, a wide-area network, a Wi-Fi network, a mobile telephone network, or combinations thereof.

The server 105, in one embodiment, may be a computer system capable of receiving and processing requests from the electronic device 110. In some embodiments, the server 105 includes a server application 140, a metadata module 150, and an update module 145. In further embodiments, the server 105 stores thin client metadata 160 and a plurality of client application files 155, including a current file package 165 for a thin client application 130. The client application files 155 may also include one or more previous filed packages 185 associated with previous versions of the thin client application 130. The current file package 165, in one embodiment, include all the files necessary to launch and run the thin client applications 130 on the electronic device 110.

In some embodiments, the thin client metadata 160 includes current version metadata 175 regarding a current version of the thin client application 130, previous version metadata 180 regarding one or more previous versions of the thin client application 130, and a version history 185 describing updates to the thin client application 130 (e.g., updates to the file package for the thin client application 130). The version history 185 may include the identified changes made to file package between each successive version of the thin client application 130. In some embodiments, the thin client metadata 160 includes application information and/or file information, as will be described hereafter.

In some embodiments, the server 105 hosts one or more applications, such as the server application 140. In certain embodiments, the server application 140 may be a website, a client/server application, or the like. In one embodiment, the server application 140 provides computational functionality to the thin client application 130, such as information processing and/or data hosting. In certain embodiments, a user of an electronic device 110 may access data stored on the server 105 via the server application 140 and the thin client application 130.

In response to the server 105 receiving an initial user request to launch the thin client application 130, the electronic device 110 may download the current file package 165, the current file package 165 including all the files necessary to launch and run the thin client application 130. The electronic device 110 may store the downloaded current file package 165 as a local file package 135. Later, the server 105 a subsequent request to launch the thin client application 130 from the same electronic device 110, wherein the server 105 checks for updates to the thin client application 130 and, if needed, returns a minimum set of updates to locally stored files for the thin client application 130.

The metadata module 150 generates and stores thin client metadata 160 of the thin client application 130 (e.g., of a file package for the thin client application 130). When the server 105 receives an update to the thin client application 130 (e.g., receives an updated file package), the metadata module 150 identifies changes made to the file package for the thin client application 130, as will be described hereafter. The metadata module 150 further updates the thin client metadata 160, including updating the information regarding the current version 160 and a previous version 165 and logging the updates in the version history 185. The server 105 stores an updated file package as the current file package 165 and stores the older file package as a previous file package 170.

The update module 145 determines whether a local file package 135 for the thin client application 130 is up-to-date and, if out of date, determines a minimum set of updates needed to update the thin client application 130 stored on the electronic device 110. For example, the update module 145 may compare application information describing locally stored files for the shim application 130, received from the shim application 125, to current version metadata 175 to determine whether the locally stored files are up-to-date.

In one embodiment, the update module 145 identifies a current file package 165 for a particular thin client application 130 among a plurality of client application files 155 and identifies a file package for the thin client application 130 on the electronic device 110 to determine whether the local file package 135 is up-to-date. In a further embodiment, the update module 145 may identify a previous file package 170 matching the local file package 135, if the local file package 135 is not up-to-date. The update module 145 compiles a minimum set of updates needed to update the local file package 135, as will be described hereafter.

In some embodiments, the metadata module 150 generates a checksum for each file in the current file package 165. The update module 145 may use the checksum to identify whether a locally stored thin client file is up-to-date. The metadata module 150 may further generate a version number, file size, and/or timestamp for each file the current file package 165. In a further embodiment, the metadata module 150 may generate a checksum, version number, file size, and/or timestamp for each file a previous file package 170, wherein the update module 145 identifies a previous file package 170 matching the local file package 135 using the checksum, version number, file size, and/or timestamp.

The electronic device 110 may be a computer workstation, a laptop computer, a tablet computer, a mobile telephone, or the like. The electronic device 110 may include a browser 120, a shim application 125, and a thin client application 130 which relies on the server application 140 to function. The thin client application 130 may comprise a local file package 135 stored on the electronic device 110, the local file package 135 including all files necessary for executing the thin client application 130. The electronic device 110 retains the local file package 135 after closing/exiting the thin client application 130.

The browser 120, in one embodiment, is a program installed on the electronic device 110 which facilitates access to data and/or applications stored on the server 105, such as the server application 140. The browser 120 may be a web browser, a file explorer, or the like. In some embodiments, the browser 120 includes a user interface for accessing, editing, and transferring data over the network 115. In certain embodiments, the browser 120 provides a user interface for authenticating the user to the server 105.

The shim application 125, in one embodiment, is a launcher application, a bootstrapping application, and/or a client application used to launch the thin client application 130. The shim application 125 may be used to send a launch request to the server 105 and download the updates needed for the thin client application 130. The shim application 125 may further download and apply updates for the thin client application 130 and/or may launch the thin client application 130.

In some embodiments, the shim application 125 determines whether a local file package 135 of the thin client application 130 is stored on the electronic device 110 and gathers application information for the locally stored files. For example, the shim application 125 may calculate and/or gather checksum information for files of the local file package 135. The shim application 125 may further include the gathered application information in a launch request sent to the server 105.

Upon connecting to the server 105, the browser 120 and/or the shim application 125 may send a launch request to the server 105. In some embodiments, the launch request includes a request to access the server 105 and to launch the server application 140. In further embodiments, the launch request may include information relating to a local file package 135 of the thin client application 130 stored locally on the electronic device 110. For example, the electronic device 110 may store application information for thin client application 130 including a version, a checksum, a file package size, and/or a date/time the thin client application 130 is downloaded from the server 105. The server 105 (e.g., the update module 145) may then use the application information included in the launch request to determine whether the locally stored thin client application 130 (e.g., the local file package 135) is up-to-date or out-of-date.

If no local file package 135 is stored on the electronic device 110, the server 105 downloads the entire current file package 165 associated with the thin client application 130 (e.g., via the shim application 125). If a local file package 135 exists on the electronic device 110 and is out-of-date, then the update module 145 identifies the minimum set of updates needed for the thin client application 130 and downloads this minimum set to the shim application 125 which then applies the updates to the thin client application 130. Otherwise, if the local file package 135 is up-to-date, then no downloads are needed and the thin client application 130 launches.

Figure 2A:
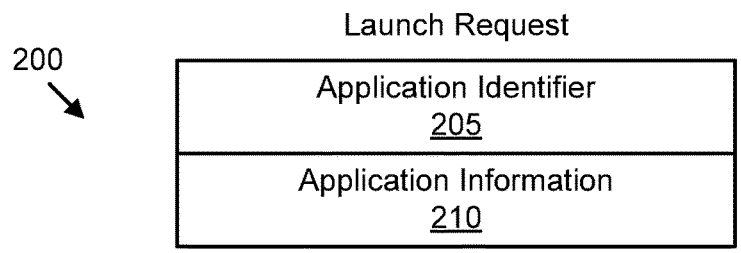
FIG. 2A is a schematic block diagram illustrating one embodiment of a launch request used for efficient deployment of thin client applications to an end user.

FIG. 2A is a schematic block diagram illustrating one embodiment of a launch request 200. The launch request 200 may be organized as a data structure that is communicated from the electronic device 110 to the server 105 via the network 115. The launch request 200 includes an application identifier 205 and application information 210. In the depicted embodiment, the launch request also includes a device identifier 215.

The application identifier 205 uniquely identifies a thin client application 130 for which a current files package 180 is hosted by the server 105. The application identifier 205 may also identify a server application 140 hosted by the server 105. In one embodiment, the application identifier 205 is a global unique software identifier (GUID) of the client application 125 and/or the server application 140.

In one embodiment, the application information 210 may indicate whether a local file package 135 for the thin client application 130 is present (e.g., locally stored) on the electronic device 110. In another embodiment, the application information 210 includes pertinent information regarding files for the thin client application 130 already stored on electronic device 110, as will be described hereafter.

Figure 2B:
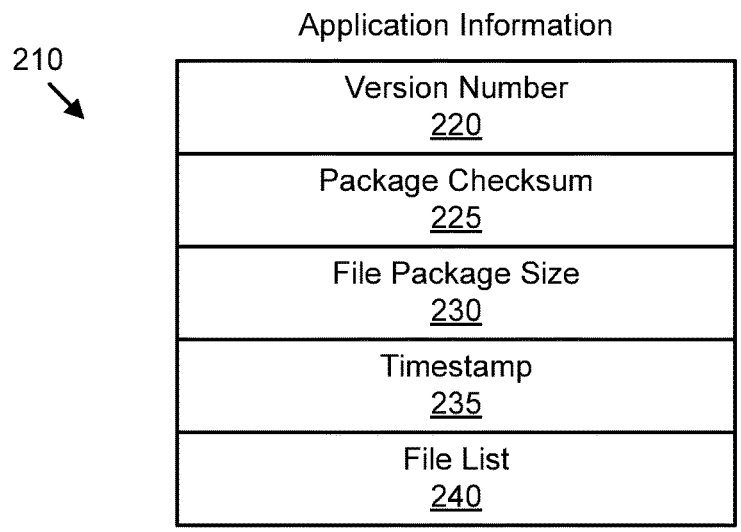
FIG. 2B is a schematic block diagram illustrating one embodiment of application information used for efficient deployment of thin client applications to an end user.

FIG. 2B is a schematic block diagram illustrating one embodiment of application information 210. The application information 210 relates to a thin client application 130 and a file package for the thin client application 130, said file package including one or more files needed to launch and run the particular thin client application 130. In some embodiments, the metadata module 150 stores application information 210 for a current version of the thin client application 130 as current version metadata 175. In further embodiments, the metadata module 150 may store application information 210 for one or more previous versions of the thin client application 130 as previous version metadata 180. Additionally, the shim application 125 may compile application 2104 files of the thin client application 130 stored on the electronic device 110.

As depicted, the application information 210 may include a version number 220, a file package checksum 225, a file package size 230, a timestamp 235, and a file list 240 of files in the file package. The timestamp 235, in one embodiment, indicates the date/time that the present version of the thin client application 130 (e.g., indicated by the version number 220) was created. In another embodiment, the timestamp 235 indicates a last modified date/time for the application.

When electronic device 110 first attempts to launch the thin client application 130, the shim application 125 downloads a complete current file package 165 from the server 105. In one embodiment, the complete file package downloaded from the server 105 includes the application information 210. In another embodiment, the electronic device 110 calculates the application information 210 in response to downloading the complete file package.

In some embodiments, the electronic device 110 includes application information 210 with a launch request 200 and the server 105 compares the received application information 210 to a current version metadata 175 to determine whether a local file package 135 is up-to-date. In one embodiment, the server 105 (e.g., via the update module 145) compares the application information 210 to the current version metadata 175 and/or to the version history 185 in order to determine whether a most current version of the thin client application 130 is stored on the electronic device 110.

For example, the server 105 may compare the version number 220, the file package checksum 225, the file package size 230, the timestamp 235, and/or the file list 240 to corresponding values for the most current version of the thin client application 130. If any current value does not match the value in the application information 210, then the server 105 concludes that an out-of-date version of the thin client application 130 is stored on the electronic device 110 and proceeds to determine a minimum set of updates needed to transform the file package stored on the electronic device 110 into a copy of the most current file package for the thin client application 130.

In some embodiments, the server 105 requests additional file information from the electronic device 110 in order to determine the minimum set of updates needed to transform the local file package 135 for the thin client application 130 into a copy of the current file package 165. In response, the shim application 125 may compile and/or retrieve the requested additional file information and return it to the server 105, as will be described hereafter.

Figure 2C:
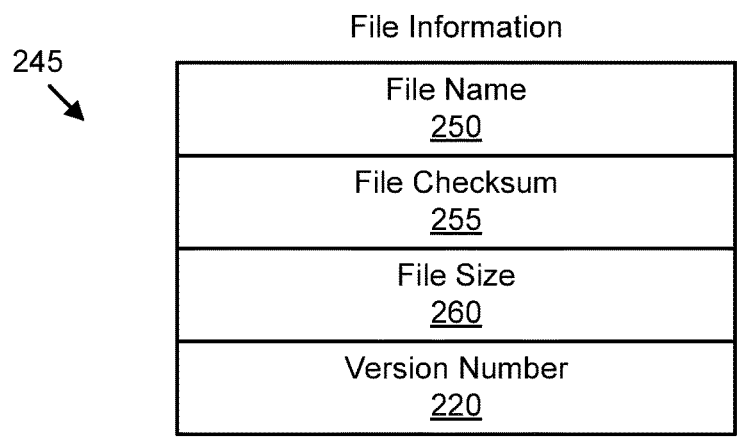
FIG. 2C is a schematic block diagram illustrating one embodiment of file information used for efficient deployment of thin client applications to an end user.

FIG. 2C is a schematic block diagram illustrating one embodiment of file information 245 relating to a thin client file used by a thin client application 130. The file information 245 may be stored on the electronic device 110 and/or on the server 105. In some embodiments, the launch request 200 may include file information 245 for each locally stored file of the thin client application 130 (e.g., each file of the local file package 135). In other embodiments, the server 105 may request file information 245 from the electronic device 110 for each file of the local file package 135.

In some embodiments, the electronic device 110 may store file information 245 for each file in a local file package 135 of the thin client application 130. In some embodiments, the server 105 may maintain file information 245 for each file in a current file package 165 for the most recent version of the thin client application 130. Accordingly, the server 105 may identify differences between a most current file and a locally stored file using the file information 245. In the depicted embodiment, the file information 245 includes: a file name 250, a file checksum 255, a file size 260, and a version number 220. In one embodiment, the version number 220 identifies a version of a thin client application 130 with which the thin client file is associated.

In certain embodiments, the server 105 uses the file information 245 to identify thin client files in the local file package 135 that are different from corresponding thin client files in a current file package 165. For example, when the server 105 receives updates to a thin client applications file package (e.g., the thin client application 130 is updated) not every file in the file package may be changed. Accordingly, the server 105 may determine which files in the file package were changed from one version to the next, wherein the minimum set of updates includes only those files which were changed from one version to the next.

In some embodiments, the server 105 may compare file checksums 255 and/or file sizes 260 to determine whether a file in the local file package 135 differs from a corresponding file in the current file package 165. In certain embodiments, the server 105 may identify a file in the local file package 135 has been corrupted requires replacement based on differing file checksums 255 and/or differing file sizes 260. For example, a file checksum 255 generated for a corrupted file would differ from a file checksum 255 generated for the uncorrupted file. In one embodiment, the entire file is included in the minimum set of updates in response to the locally stored file being corrupt. In another embodiment, the server 105 identifies the corrupted portions of the corrupt file, wherein the minimum set of updates includes only corrections and placement instructions for the corrupted portions of the locally stored file.

In some embodiments, the server 105 may identify a file in the local file package 135 that differs from its corresponding file in the current file package 165 in file name 250. Accordingly, the minimum set of updates may include instructions to change the file name 250 without including the rest of the file (e.g., due to no other changes existing between the versions stored on the electronic device 110 on the server 105). Similarly, if the same thin client file is used from one version to the next of the thin client application 130, the version number 220 associated with a file may be updated.

In certain embodiments, the server 105 accesses file information 245 stored on the server 105 and corresponding to the version number 220 of the local file package 135 in order to reduce network traffic and/or decrease time needed to determine the minimum set of updates. However, in other embodiments, the electronic device 110 sends file information 245 to the server 105 in order to ensure that no locally stored files are corrupted.

FIG. 2D is a schematic block diagram illustrating one embodiment of an application package 265. The application package 265 includes all files 270 necessary to launch and run the particular thin client application 130. As depicted, in further embodiments, the application package 265 includes an application identifier 205, application information 210, and file information 245 for each file 270 included in the application package 265. The server 105 stores a plurality of application packages 265 as part of the client application files 155. For example, the current file package 165 comprises an application package 265. As another example, any previous file package 170 may also include an application package 265.

In certain embodiments, the server 105 receives a new application package 265 whenever the thin client application 130 is updated. The server 105 may compare the new application package 265 to a previous application package 265 to determine differences between a prior version of the thin client application 130 and the most current version. In one embodiment, the server 105 creates a minimum set of updates needed to transform the previous application package 265 into the new application package 265, for example in response to determining the differences between the two versions of the thin client application 130. Accordingly, the server 105 may assemble the minimum set of updates prior to determining whether the thin client application 130 stored on the electronic device 110 is out-of-date in order to provide faster thin application client delivery.

FIG. 2E is a schematic block diagram illustrating one embodiment of a version history 185 stored on the client 105. Each version history 185 is associated with a particular thin client application 130, as indicated by the application identifier 205. The version history 185 includes information for a current version 160 of the thin client application 130. Additionally, in some embodiments, the version history 185 includes information for one or more previous versions 165 of the thin client application 130. In the depicted embodiment, the version history 185 includes: a version number 220, a package checksum 225, a file list of files in the application file package (e.g., file names or other file identifiers), and a files pointer 275 for each version of the thin client application 130.

In one embodiment, the package checksum 225 comprises a checksum (e.g., an MD5 checksum or the like) calculated for an application package 265 corresponding to the identified version number 220. Additionally, the file list 240 the application file package may indicate a number of files 270 in the application package 265 corresponding to the identified version number 220. In certain embodiments, the files pointer 275 indicates the location (e.g., on the server 105 or on a networked storage device) where the corresponding application package 265 is stored. For example, the files pointer 275 corresponding to the current version 160 of the thin claim application 130 points to a storage location of the current files package 180 and the files pointer 275 corresponding to a previous version 165 points to a storage location of the previous files package 185 for that version of the thin client application 130.

FIG. 2F is a schematic block diagram illustrating one embodiment of a minimum update packet 280 sent to the shim application 125 for updating the thin client application 130. The minimum update packet 280 contains the minimum set of updates needed to update the file local file package 135 stored on the electronic device 110. In certain embodiments, the update module 145 creates a minimum update packet 280 each time an updated file package is received for the thin client application 130. For example, when the current file package 165 is received, the update module 145 may create a minimum update packet 280 based on differences between files of the current file package 165 and the previous file package 170.

As depicted, the minimum update packet 280 includes an application identifier 205 identifying the thin client application 130. The minimum update packet 280 also includes a file identifier 285 that indicates a file in need of updating. In one embodiment, the file identifier 285 may be a file name 250. In another embodiment, the file identifier 285 may be a combination of file name 250, file checksum 255, and file size 260 which uniquely identifies a file in the local file package 135 for the thin client application 130.

Each file identifier 285 is accompanied by file changes 290 and placement instructions 295. The file changes 290 include differences between the locally stored version of the identified file and a most current version of the identified file. In some embodiments, the file changes 290 include one or more bytes that differ between the different versions of the identified file. The placement instructions 295 indicate which portions of the identified file are to be replaced with the file changes 290.

In response to receiving the minimum update packet 280, the shim application 125 applies the received updates to the files of the thin client application 130. In response to applying the updates, the shim application 125 may then launch the updated thin client application 130.

Figure 3A:
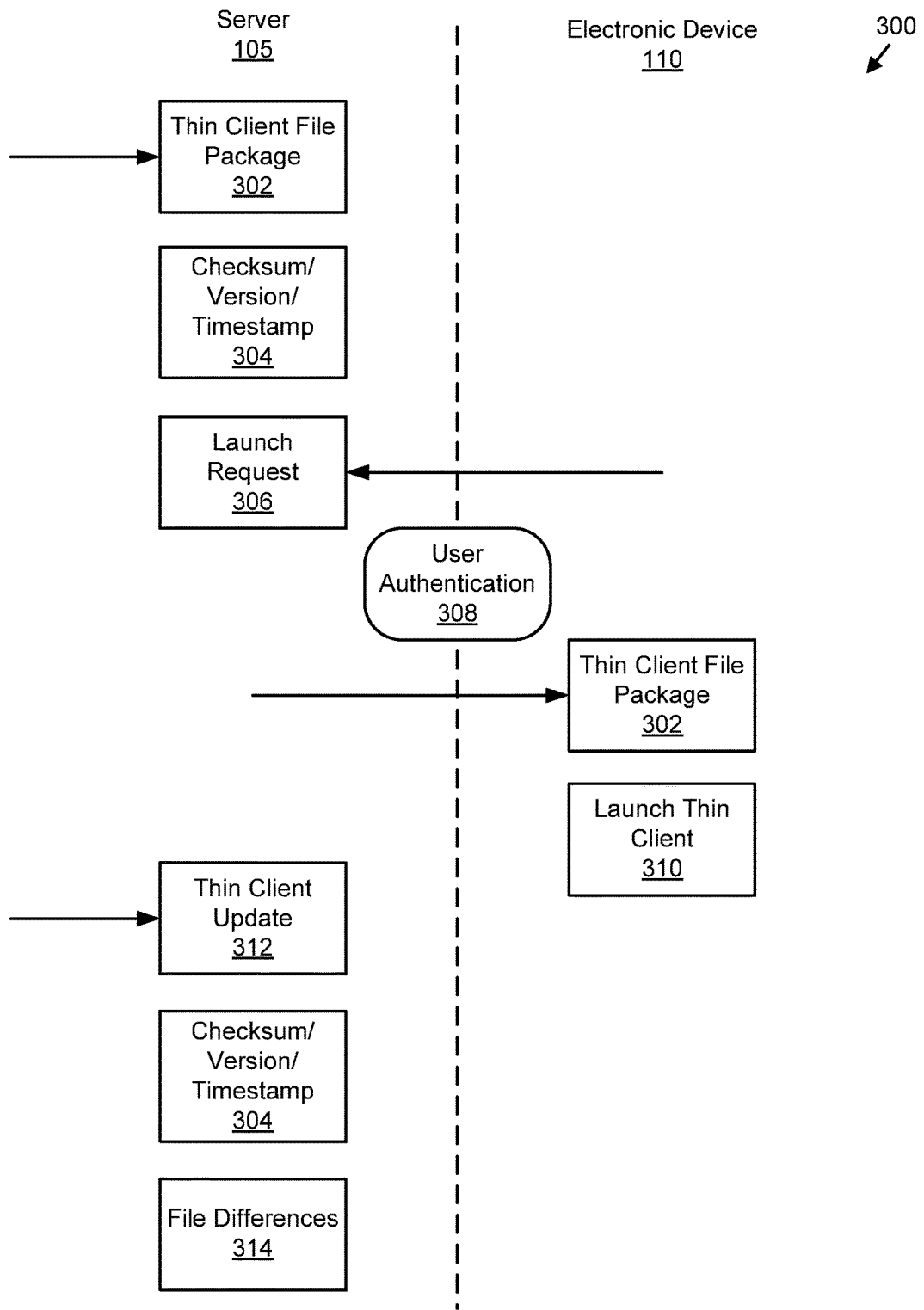
FIG. 3A is a schematic block diagram illustrating one embodiment of data creation and flow for efficient deployment of thin client applications to an end user.
Figure 3B:
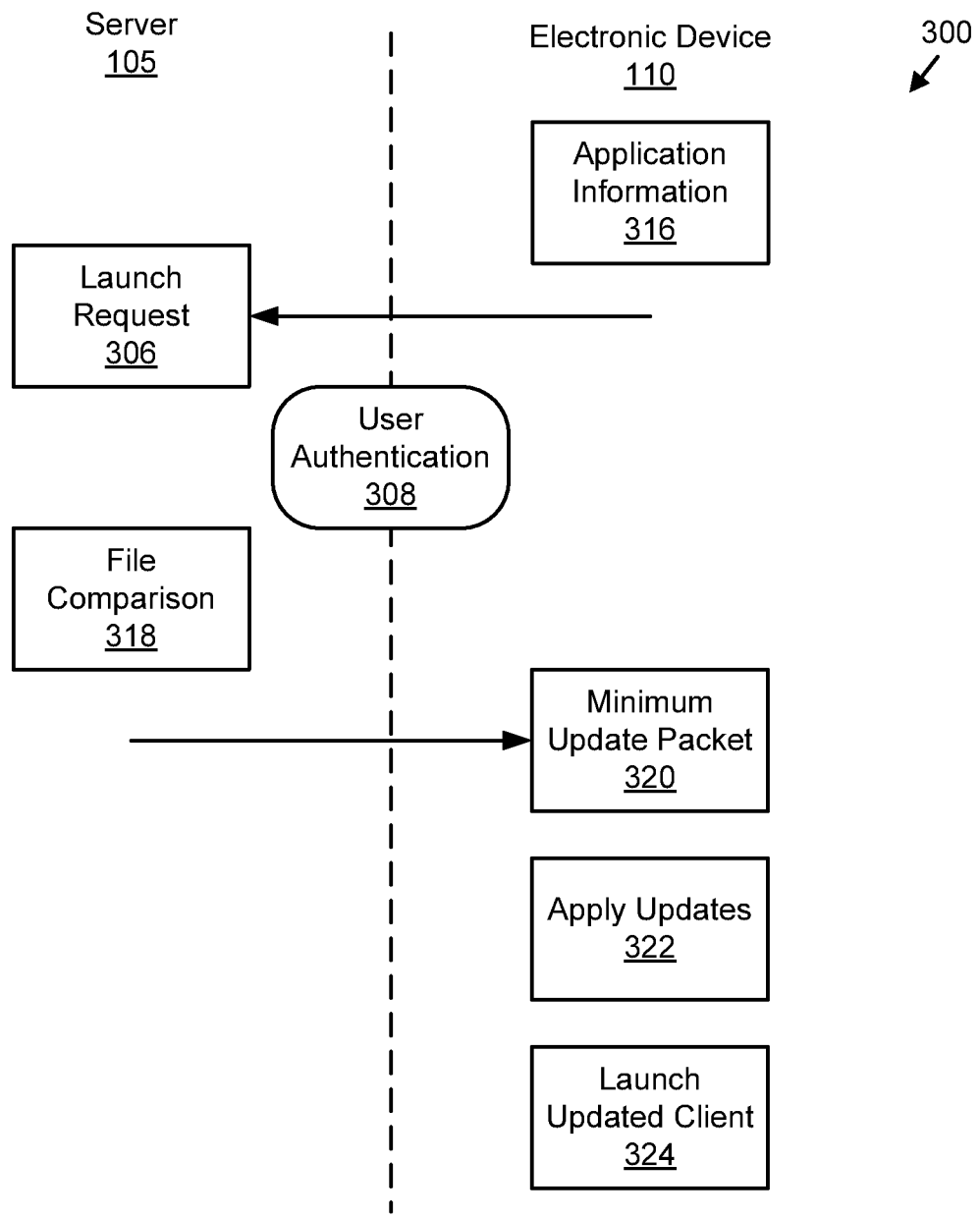
FIG. 3B is a schematic block diagram illustrating a continuation of the data creation and flow of FIG. 3A.

FIGS. 3A-3B are schematic block diagrams illustrating one embodiment of data creation and data flow 300 between that the server 105 and the electronic device 110. In the depicted embodiment, the server 105 receives a file package for a thin client application (e.g., thin client application 130), receives an initial request to launch the thin client application on the electronic device 110, and downloads the entire file package to the electronic device 110. Later, the thin client application is updated at the server 105 and when the electronic device 110 makes a subsequent launch request, the server 105 determines whether the local file package 135 is out-of-date. The server 105 compares the locally stored files to the updated files stored on the server 105 and downloads a minimum set of updates to the electronic device 110 such that the local file package 135 matches the current file package 165.

FIG. 3A depicts the server 105 receiving a thin client file package 302. In some embodiments the thin client file package 302 is an application package 265, as described above with reference to FIG. 2D. In one embodiment, the server designates the thin client file package 302 as the current file package 165 for the thin client application 130.

In response to receiving the thin client file package 302, the server 105 creates checksum, version, and/or timestamp information 304 for the thin client file package 302. In certain embodiments, the server 105 stores the created checksum, version, and timestamp information 304 as a current version information 160 of thin client metadata 160 for the thin client application 130. In some embodiments, the server 105 also creates checksum, version, and/or timestamp information for each file in the thin client file package 302. In one embodiment, the server 105 creates application information 210 for the thin client file package 302, the application information 210 including version number 220, a package checksum 225, and a timestamp 235. In a further embodiment, the server 105 creates file information 245 for each file in the thin client file package 302.

The server 105 receives a launch request 306 from the electronic device 110 identifying a thin client application 130. For example, the launch request 306 may be an HTTP request to the server 105. In some embodiments, the launch request 306 is substantially similar to the launch request 200 described above with reference to FIG. 2A. In certain embodiments, the server 105 and the electronic device 110 perform user authentication 308 in response to the launch request 306.

In the depicted embodiment, the electronic device 110 does not have any locally stored files for the thin client application 130. Accordingly, the server 105 downloads the entire thin client file package 302 to the electronic device 110. Responsive to receiving the thin client file package 302, the electronic device 110 launches the thin client 310. Launching the thin client 310 may include installing a thin client application (e.g., the thin client application 130). In some embodiments, the shim application 125 is used to download the thin client file package 302 and launch the thin client 310. The electronic device 110 retains (e.g., stores and nonvolatile memory) the thin client file package 302 so that the thin client application 130 may be run again at a future date without the need to re-download the thin client file package 302.

The server 105 receives a thin client update 312 (e.g., an update to the thin client application 130). In some embodiments, the thin client update 312 includes a new application package 265 wherein one or more files 270 are changed from the thin client file package 302. In other embodiments, the thin client update 312 only includes one or more files 270 replacing corresponding files in the thin client file package 302.

In response to receiving the thin client update 312, the server 105 creates checksum, version, and timestamp information 304 for the thin client update 312. For example, the server 105 may create new application information 210 for a new application package 265 included with the thin client update 312. Additionally, the server 105 identifies file differences 314 between the thin client file package 302 and the thin client update 312, for example by comparing checksums, timestamps, version numbers, file sizes, filenames, and/or other relevant information. In some embodiments, the server 105 looks for new files, remove files, renamed files, and updates to existing files as part of the file differences 314.

In one embodiment, the file differences 314 include one or more changed bytes within a file modified by the thin client update 312. For example, for each file having differing checksums, timestamps, and/or size from one version (e.g., the version stored on the electronic device 110) to the next version (e.g., the updated version stored on the server 105) the update module 145 may perform a byte-by-byte comparison, such as a binary differential comparison, of the earlier version to the later version. Accordingly, the update module 145 may create a list of what bytes changed and where in each file that is part of the thin client application. The update module 145 may also update the version number 220 for the updated thin client file package (e.g., the current file package 165).

The server 105 maintains an update history of all versions of the thin client application 130 (e.g., the version history 185) and stores the file differences 314 the update history. For example, the update history may identify which files were renamed, which files were added, and/or which files were removed from one version to the next.

FIG. 3B depicts the electronic device 110 gathering application information 136 and sending a second launch request 306 to the server 105. In one embodiment, the electronic device 110 sends the second launch request 306 in response to a user request to launch again the thin client application 130. Here the second launch request 306 includes information about the existing local installation of the thin client application 130 (e.g., the local file package 135). For example, the second launch request 306 may identify the version, the checksums, a file size, a timestamp, and/or the number of files stored on the electronic device 110.

While gathering application information 316 is depicted as occurring immediately prior to sending the launch request 306, in one embodiment the application information 316 may be gathered in response to receiving the thin client file package 302 and/or in response to launching the thin client 310. In some embodiments, the server in the electronic device 110 may again perform user authentication 308 in response to the second launch request 306.

In response to receiving the second launch request 306, the server 105 performs file comparison 318 between the current file package 165 (e.g., the thin client file package 302 as updated by the thin client update 312) and the local file package 135 stored on the electronic device 110, as indicated by the application information 316 included in the second launch request 306. In one embodiment, the server 105 compares checksums of each file in the local file package 135 to checksums of corresponding files in the current file package 165 to determine if anything has changed. If the checksums match then nothing has changed and no update is needed for the compared files.

Otherwise, if the checksums do not match then the compared locally stored file has been updated by the thin client update 312 and the server 105 retrieves and/or compiles a minimum set of updates needed to update the locally stored file. The minimum set of updates for each updated file are added to the minimum update packet 320 which is downloaded to the electronic device 110. The minimum update packet 320 may include minimum set of updates (e.g., file changes 290) and update instructions (e.g., placement instructions 295) for each affected file. In one embodiment, the minimum update packet 320 is substantially similar to the minimum update packet 280 described above with reference to FIG. 2F.

In some embodiments, the server 105 may determine whether any files needed for the current file package 165 have been removed from the electronic device 110. In response to a needed file being removed, the server 105 will restore the missing file by including it in the minimum update packet 320. Conventionally, if a file is missing the entire thin client application file package 302 would be deleted from the electronic device 110 and re-downloaded from the server 105. In one embodiment, if a file is missing from the local file package 135, then only the affected file is restored from the current file package 165. In certain embodiments, the server 15 may determine whether any files needed to the current file package 165 have been renamed from a previous file package 170. In response to a thin client file being renamed from one version to the next, the server 105 may include instructions to rename a file of the local file package 135 in the minimum update packet 320.

In certain embodiments, the server 105 may check for corrupted thin client files on the electronic device 110 by comparing a checksum calculated from the locally stored file to an expected checksum based on the version number of the local installation. For example, the expected checksum may be created from a file in a previous file package 170. If the two checksums match, then the locally stored file is not corrupted. However, if the two checksums do not match, then the locally stored file is corrupted. Conventionally, if a file is corrupt the entire thin client application file package 302 would be deleted from the electronic device 110 and re-downloaded from the server 105. In one embodiment, if a locally stored file is corrupted, then only the affected file is restored from the current file package 165.

After receiving the minimum update packet 320, the electronic device 110 applies the updates 322 to the local file package 135 per the update instructions. For example, the update instructions may include directions to change certain bytes within a file, insert a string of bytes into a file, rename a file, delete a file, and the like. Once the updates are applied, the electronic device 110 may launch the updated thin client application 324.

Figure 4:
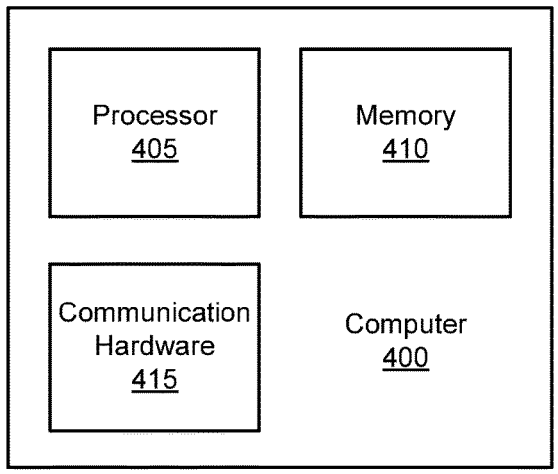
FIG. 4 is a schematic block diagram illustrating one embodiment of a computer for efficient deployment of thin client applications to an end user.

FIG. 4 is a schematic block diagram illustrating one embodiment of a computer 400. The computer 400 may be embodied in the server 105. In addition, the computer 400 may be embodied in the electronic device 110. In the depicted embodiment, the computer 400 includes a processor 405, a memory 410, and communication hardware 415. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices. For example, the communication hardware 415 may communicate with the network 115.

Figure 5:
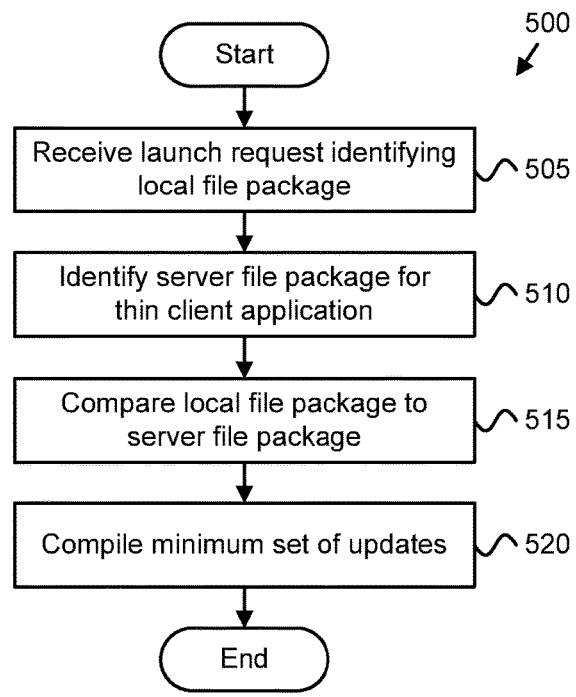
FIG. 5 is a schematic flow chart diagram illustrating one embodiment of a method for efficient deployment of thin client applications to an end user.

FIG. 5 is a schematic flow chart diagram illustrating one embodiment of a method 500 for efficient deployment of thin client applications to an end user. The method 500 efficiently deploys the client applications, such as the thin client application 130, from the server 105 to the electronic device 110. The method 500 may be performed by a processor 405. Alternatively, the method 500 may be performed by a computer readable storage medium such as the memory 410. The computer readable storage medium may store code that is executed other processor 405 to perform the functions of the method 500.

The method 500 starts, and in one embodiment, the server 105 receives 505 a launch request for the thin client application from a local device (e.g., the electronic device 110), the launch request identifying a local file package 135 stored on the local device. In one embodiment, the launch request is substantially similar to the launch request 200 described above with reference to FIG. 2A.

The server 105 identifies 510 a server file package for a thin client application (e.g., the thin client application 130), the server file package corresponding to a current version of the thin client application. The server file package may be substantially similar to the current file package 165 stored on the server 105. In one embodiment, the server 105 identifies 510 the server from package in response to receiving 505 the launch request.

The server 105 compares 515 the local file package 135 to the server file package. In some embodiments, comparing 515 the local file package 135 to the server file package includes comparing a version number of the local file package 135 to a version number of the server file package. In some embodiments, comparing 515 the local file package 135 to the server file package includes comparing a file list of the local file package 135 to a file list of the server file package.

In some embodiments, the launch request includes a checksum for each file of the local file package 135, wherein comparing 515 the local file package 135 to the server file package includes comparing a checksum of the local file package 135 to a checksum of the server file package. In further embodiments, comparing 515 the local file package 135 to the server file package may include comparing checksums for one or more files of the local file package 135 to checksums of one or more files of the server file package.

The server 105 compiles 520 a minimum set of updates needed to transform the local file package 135 into a copy of the server file package. In some embodiments, compiling 520 the minimum set of updates includes one or more files in a file list of the server file package that are not present in a file list of the local file package 135. In certain embodiments, the minimum set of updates includes a current version of a file for which the local checksum and the server checksum do not match. In one embodiment, the minimum set of updates comprises a minimum update packet 280 as described above with reference to FIG. 2F. The method 500 ends.

Figure 6:
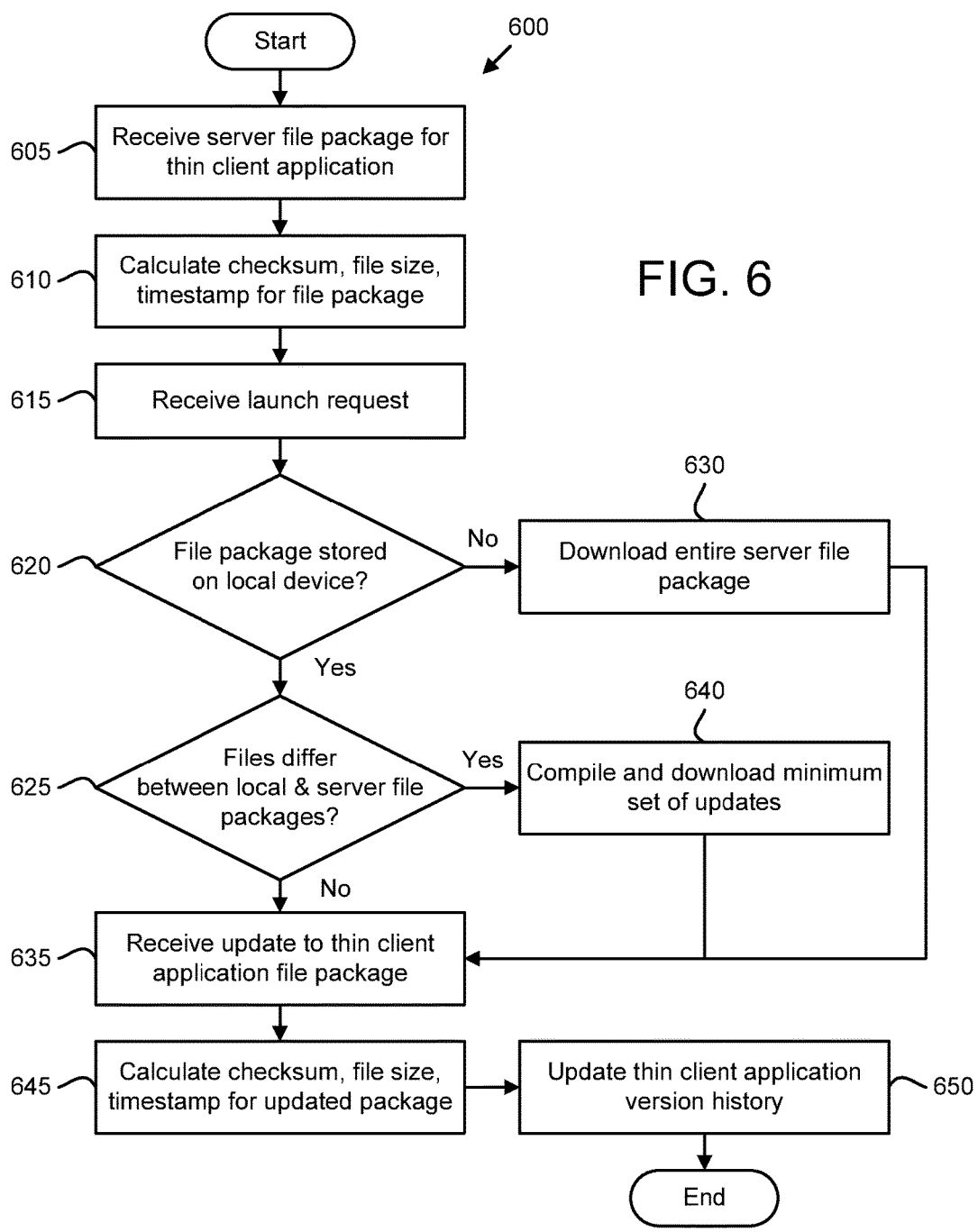
FIG. 6 is a schematic flow chart diagram illustrating another embodiment of a method for efficient deployment of thin client applications to an end user.

FIG. 6 is a schematic flow chart diagram illustrating one embodiment of a method 600 for efficient deployment of thin client applications to an end user. The method 600 efficiently deploys the client applications, such as the thin client application 130, from the server 105 to the electronic device 110. The method 600 may be performed by a processor 405. Alternatively, the method 600 may be performed by a computer readable storage medium such as the memory 410. The computer readable storage medium may store code that is executed other processor 405 to perform the functions of the method 500.

The method 600 starts, and in one embodiment, the server 105 receives 605 a server file package for thin client application (e.g., the thin client application 130). In some embodiments, receiving 605 the server file package includes storing the server file package as a current file package 165. In further embodiments, receiving 605 the server file package may include storing an older server file package as a previous file package 170. The server 105 calculates 610 a checksum, a file size, and a timestamp for the server file package. In some embodiments, calculating 610 the checksum, file size, and timestamp includes creating current version metadata 175 based on the server file package (e.g., the current file package 165).

The server receives 615 a launch request 200 for the thin client application from a local device (e.g., the electronic device 110). In one embodiment, the launch request 200 is substantially similar to the launch request 200 described above with reference to FIG. 2A. In response to receiving 615 the launch request, the server 105 determines 620 whether a file package is already stored on the local device. In some embodiments, determining 620 whether the file package is already stored on the block device includes determining whether the launch request 200 includes application information 210.

If a file package is already stored on the local device, then the server 105 determines 625 whether files differ between the local file package 135 and the server file package. Otherwise, if a file package is not stored on the local device, the server 105 downloads 630 the entire server file package to the local device. Determining 625 whether files differ between the local file package 135 and the server file package, in one embodiment, includes comparing a version number of the local file package 135 to a version number of the server file package. In some embodiments, determining 625 whether files differ between the local file package 135 and the server file package includes comparing a file list of the local file package 135 to a file list of the server file package.

In some embodiments, the launch request 200 includes a checksum for each file of the local file package 135, wherein determining 625 whether files differ between the local file package 135 and the server file package includes comparing a checksum of the local file package 135 to a checksum of the server file package. In further embodiments, determining 625 whether files differ between the local file package 135 and the server file package may include comparing checksums for one or more files of the local file package 135 to checksums of one or more files of the server file package.

If one or more files of the local file package 135 differ from corresponding files of the server file package, and the server 105 compiles 635 a minimum set of updates and downloads them to the local device. Otherwise, if no files of the local file package 135 differ from corresponding files of the server file package, the no downloads are necessary in the server receives 640 an update to the server file package for the thin client application.

In some embodiments, receiving 640 an update to the server file package includes receiving a new file package, storing the previously received server file package as a previous file package 170, and storing the new file package as a current file package 165.

Next, the server 105 identifies 645 changes to the server file package based on the received updates. In one embodiment, identifying 645 changes to the server file package includes calculating application information 210 for the new file package and for the previously received server file package and comparing the application information 210. In another embodiment, identifying 645 changes to the server file package includes calculating file information 245 for each file in the new file package and comparing it to file information 245 for each file of the previously received server file package. In some embodiments, identifying 605 changes to the server file package includes performing a binary differential comparison for each file on the new file package to corresponding files of the previously received server file package. The identified changes may be used to compile a minimum set of updates.

The server 105 updates 650 a version history 185 for the thin client application 130, in response to identifying 645 changes to the server file package based on the received updates. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
   receive a launch request from a shim application at a local device, the launch request being a request to launch a server application corresponding to a thin client application, the shim application being a bootstrapping application for downloading and executing the thin client application;
   identify a first file package of the thin client application in response to receiving the launch request, the first file package comprising a plurality of files stored on the local device, wherein the launch request includes identifying information for the first file package;
   identify a second file package stored on the server and corresponding to a current version of the thin client application, the second file package comprising a plurality of files;
   compare the first file package to the second file package, wherein comparing the first file package to the second file package comprises identifying one or more files that differ between the first file package and the second file package;
   compile a minimum set of updates needed to transform the first file package into a copy of the second file package, in response to the first file package differing from the second file package; and
   transfer the compiled minimum set of updates and update instructions to the shim application, the update instructions describing how the minimum set of updates are to be placed into the first file package, wherein the shim application uses the minimum set of updates and update instructions to transform the first file package into the second file package.

2. The apparatus of claim 1, wherein comparing the first file package to the second file package comprises:
   generating a first checksum from the second file package; and
   comparing the first checksum to a local checksum generated from the first file package, wherein the identifying information comprises the local checksum.

3. The apparatus of claim 1, wherein compiling the minimum set of updates comprises an action selected from the group consisting of: identifying a file in the first file package that is renamed in the second file package, identifying a file in the second file package that is not present in the first file package, and identifying a file within the first file package corresponding to an updated file within the second file package.

4. The apparatus of claim 1, wherein the processor further identifies a corrupted or missing file within the first file package, wherein the minimum set of updates includes a copy of the corrupted or missing file within the first file package.

5. The apparatus of claim 1, wherein the processor further generates a binary differential from the first file package and the second file package, the binary differential indicating a location and value of a byte changed between the second file package and the first file package, wherein the minimum set of updates is based on the binary differential.

6. A method comprising:
   receiving, by use of a processor, a launch request from a shim application at a local device, the launch request being a request to launch a server application corresponding to a thin client application, the shim application being a bootstrapping application for downloading and executing the thin client application;
   identifying a first file package for the thin client application in response to receiving the launch request, the first file package comprising a plurality of files stored on the local device, wherein the launch request identifies the first file package stored on the local device;
   identifying a second file package stored on a server and corresponding to a current version of the thin client application, the second file package comprising a plurality of files;
   comparing the first file package to the second file package, wherein comparing the first file package to the second file package comprises identifying one or more files that differ between the first file package and the second file package;
   compiling a minimum set of updates needed to transform the first file package into a copy of the second file package; and
   downloading the compiled minimum set of updates and update instructions to the shim application, the update instructions describing how the minimum set of updates are to be placed into the first file package, wherein the shim application uses the minimum set of updates and update instructions to transform the first file package into the second file package.

7. The method of claim 6, wherein comparing the first file package to the second file package comprises comparing a first version number of the first file package to a second version number of the second file package.

8. The method of claim 6, wherein comparing the first file package to the second file package comprises comparing a first file list of the first file package to a second file list of the second file package, wherein compiling a minimum set of updates comprises including one or more files in the second file list that are not in the first file list.

9. The method of claim 8, wherein comparing the first file package to the second file package further comprises comparing a first checksum for a first each file in the first file list to a second checksum for a matching file in the second file list, wherein the minimum set of updates includes the matching file in response to the first checksum differing from the second checksum.

10. The method of claim 8, wherein comparing the first file package to the second file package further comprises comparing a first byte of a first file in the first file list to a second byte of a corresponding file in the second file list, wherein compiling a minimum set of updates comprises including the second byte and placement information for the second byte in response to the first byte differing from the second byte.

11. The method of claim 6, further comprising storing a version history of the thin client application, the version history including changes to files associated with the thin client application from previous version to a newer version, wherein compiling a minimum set of updates is based on the version history.

12. The method of claim 6, further comprising:
   detecting an update to the second file package;
   identifying changes to the second file package due to the update; and
   storing the changes in a version history of the thin client application.

13. The method of claim 6, further comprising generating identifying information for the second file package, the identifying information for the second file package comprising one or more of a file list, a version number, a checksum, a file size, and a timestamp.

14. The method of claim 6, wherein the launch request includes identifying information for the first file package, the identifying information for the first file package comprising one or more of a file list, a version number, a checksum, a file size, and a timestamp.

15. A program product comprising a non-transitory computer readable storage medium that stores code executable by a processor, the executable code comprising code to perform:
   receiving a launch request from a shim application at a local device, the launch request being a request to launch a server application corresponding to a thin client application, the shim application being a bootstrapping application for downloading and executing the thin client application;
   identifying a first file package for the thin client application in response to receiving the launch request, the first file package comprising a plurality of files stored on the local device, wherein the launch request identifies the first file package stored on the local device;
   determining whether the local file package is out of date in response to the launch request;
   identifying a server file package for to the thin client application in response to the local file package being out of date, the server file package corresponding to a current version of the thin client application, wherein the server file package comprises a plurality of files;
   comparing the first file package to the server file package, wherein comparing the first file package to the server file package comprises identifying one or more files that differ between the first file package and the server file package;
   compiling a minimum set of updates needed to transform the first file package into a copy of the server file package; and
   downloading the compiled minimum set of updates and update instructions to the shim application, the update instructions describing how the minimum set of updates are to be placed into the first file package, wherein the shim application uses the minimum set of updates and update instructions to transform the first file package into the server file package.

16. The program product of claim 15, further comprising identifying a file in the local file package that is renamed in the server file package, wherein the minimum set of updates comprises instructions to rename the file in the local file package.

17. The program product of claim 15, further comprising determining whether any file in the local file package is corrupted, wherein downloading the minimum set of updates includes downloading an uncorrupted version of the file.

18. The program product of claim 17, wherein the launch request includes a checksum for each file of the local file package, and wherein determining whether any file in the local file package is corrupted comprises comparing a checksum for each file in the local file package to a corresponding file in the server file package.

* * * * *